United States Patent
Qi et al.

(10) Patent No.: US 8,190,167 B2
(45) Date of Patent: May 29, 2012

(54) WIRELESS DEVICE CHANNEL SELECTION USING DYNAMIC CHANNEL ALLOCATION

(75) Inventors: Emily H. Qi, Portland, OR (US); Marc Meylemans, Beaverton, OR (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 12/240,610

(22) Filed: Sep. 29, 2008

(65) Prior Publication Data

US 2010/0081447 A1   Apr. 1, 2010

(51) Int. Cl.
*H04W 72/00*   (2009.01)

(52) U.S. Cl. .................. 455/452.1; 370/468; 370/466; 370/338; 455/434

(58) Field of Classification Search ............... 455/452.1
See application file for complete search history.

(56) References Cited

U.S. PATENT DOCUMENTS

| 1,952,910 | A1 | 12/2007 | Yang et al. |
| 7,313,153 | B2* | 12/2007 | Sugaya ............. 370/468 |
| 2002/0061031 | A1* | 5/2002 | Sugar et al. .......... 370/466 |
| 2005/0226178 | A1 | 10/2005 | Forand et al. |
| 2006/0019660 | A1* | 1/2006 | Li ....................... 455/434 |
| 2006/0227753 | A1 | 10/2006 | Vleugels |
| 2007/0076649 | A1 | 4/2007 | Lin et al. |
| 2007/0274275 | A1* | 11/2007 | Laroia et al. ......... 370/338 |
| 2008/0062919 | A1 | 3/2008 | Chen et al. |

* cited by examiner

*Primary Examiner* — Nick Corsaro
*Assistant Examiner* — Gerald Johnson
(74) *Attorney, Agent, or Firm* — Schwabe, Williamson & Wyatt, P.C.

(57) ABSTRACT

Embodiments of methods and apparatus for dynamic channel allocation are disclosed. In various embodiments, an access point (AP) of an infrastructure based wireless network may allocate one or more wireless channels to wireless devices of a non-infrastructure based wireless network. The allocated channels may be selected to reduce a likelihood of communications among the devices of the non-infrastructure based wireless network interfering with communications among the devices of the infrastructure based wireless network. Additional variants and embodiments may also be disclosed and claimed.

21 Claims, 4 Drawing Sheets

| Use mode value | Purpose |
| --- | --- |
| 0 | Second Network 14 |
| 1 | Peer-2-Peer Network |
| 2 | Paging |
| 3 | Roaming |
| 4 | Parking |
| 5-7 | Reserved |

WIRELESS DEVICE CHANNEL SELECTION USING DYNAMIC CHANNEL ALLOCATION

TECHNICAL FIELD

Embodiments of the disclosure relate generally to wireless networks, and more particularly, to methods and apparatuses for dynamic channel allocation in wireless networks.

BACKGROUND

Wireless communication networks are becoming more and more popular at enterprises, homes, schools, etc. With an increase in such wireless communication networks, chances of channel interference among two geographically neighboring (or overlapping) wireless networks may increase unless, for example, the two networks utilize different frequency channels for communication. For example, to minimize radio interference in an environment where a first wireless network (e.g., a wireless local area network (WLAN)) and a second wireless network (e.g., a wireless personal area network (WPAN)) co-exist, it may be intended to operate the devices associated with the first network in one or more frequency channels different from the channels used by the devices of the second network.

BRIEF DESCRIPTION OF THE DRAWINGS

Various embodiments will be described referencing the accompanying drawings in which like references denote similar elements, and in which.

DETAILED DESCRIPTION OF ILLUSTRATIVE EMBODIMENTS

Illustrative embodiments include, but are not limited to, methods and apparatus for dynamic channel allocation in wireless networks.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

Figure 1:
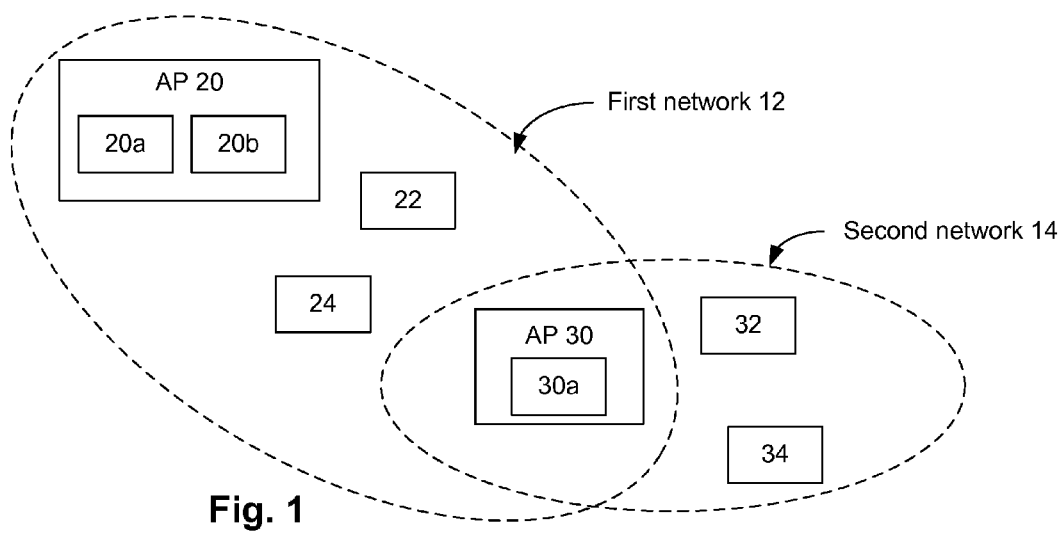
FIG. 1 illustrates a wireless system, in accordance with various embodiments of the present disclosure.

FIG. 1 illustrates a wireless system 10, in accordance with various embodiments of the present disclosure. The system 10 includes a first network 12 and a second network 14, the areas of coverage of which are illustrated by respective dotted lines. It should be readily apparent to those skilled in the art that the elliptical area of coverage of each network, as illustrated in FIG. 1, is purely exemplary in nature. In practice, the actual area of coverage may take any shape and size, and may be based in part on several factors, e.g., number, type and/or strength of antennas used, type of the network, etc. For example, in various embodiments, the coverage area of the second network 14 may be entirely within that of the first network 12.

In various embodiments, the wireless system 10 may include a plurality of wireless devices 20, 22, 24, 30, 32, and 34 associated with the first network 12 and/or the second network 14. That is, each of these wireless devices may communicate with at least another wireless device through the first network 12 and/or the second network 14. It should be readily apparent that the number and/or the position of the devices associated with the first network 12 and/or the second network 14 are purely exemplary in nature.

In various embodiments, the first wireless network 12 may be an infrastructure based wireless network, e.g., a (wireless local area network) WLAN, a Wi-Fi LAN, a wireless metropolitan area network (WMAN), a worldwide interoperability for microwave access (WiMAX) network, or any other suitable type of wireless network known to those skilled in the art. In various embodiments, device 20 may be configured to operate as an access point (AP) for the first network 12, and may include a selector 20a and a transmitter 20b. It should be apparent to those skilled in the art that the first network 12 may include any number of APs, although a single AP is identified here. The other devices 22, 24, and 30 may be wireless stations (STAs) associated with the first network 12 and may be configured to wirelessly communicate with at least the AP 20. Each of the devices 22, 24, and 30 may be, for example, one of a laptop, a desktop, a personal digital assistant (PDA), a mobile phone, a palm top, or any other suitable type of wireless device configured to wirelessly communicate with at least the AP 20.

In various embodiments, the second network 14 may be a non-infrastructure based wireless network, e.g., a wireless personal area network (WPAN), a Wi-Fi PAN, an independent basic service set (IBSS) network, a wireless peer-to-peer network, or any other suitable type of wireless network known to those skilled in the art. The wireless device 30 may be associated with both the first network 12 and the second network 14, and be configured to act as an AP for the second network 14, and may include a receiver 30a. The AP 30 may be, for example, a laptop configured to wirelessly communicate with the AP 20 of the first network 12 and further configured to operate as a soft access point for the second network 14.

In various embodiments, the first network 12 and the second network 14 may use different protocols for communication. For example, communication among the devices associated with the first network 12 may be in accordance with a first wireless communication protocol, whereas communication among the devices associated with the second network 14 may be in accordance with a second wireless communication protocol that is different from the first wireless communication protocol.

In some embodiments, communications within the first network 12 and the second network 14 may be in accordance with a common wireless communication standard, yet utilize different infrastructure types. For example, the first network 12 may be an infrastructure based Wi-Fi LAN and the second network 14 may be a non-infrastructure based Wi-Fi PAN. In this case, communications within both networks may be in accordance with the Institute of Electrical and Electronics Engineers (IEEE) 802.11-2007 standard along with any amendments, revisions, and/or updates thereto. The benefits of the teachings of this disclosure may be particularly advantageous to these embodiments, as the potential for interference may be higher than when communications of the two networks are in accordance with different standards.

In various embodiments, wireless devices 32 and 34 may be associated with the second network 14 and may be configured to wirelessly communicate with at least the AP 30. Each of the devices 32 and 34 may be, for example, one of a printer, a digital camera, a wireless keyboard, a wireless mouse, a wireless headphone, a wireless music player, or any other suitable type of wireless device configured to be associated with the second network 14 and communicate wirelessly with at least with AP 30.

Figure 2A:
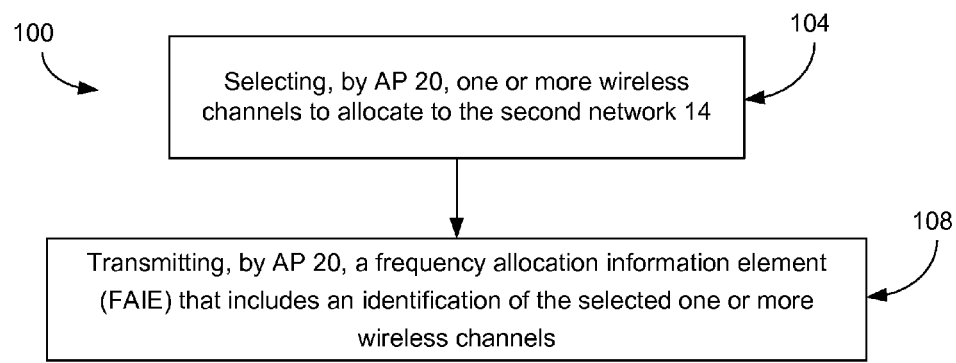
FIGS. 2a and 2b illustrate a flow chart of a method for dynamic channel allocation, in accordance with various embodiments of the present disclosure.

FIG. 2a illustrates a flowchart of a method 100 for dynamic channel allocation, in accordance with various embodiments of the present disclosure. Referring to FIGS. 1 and 2a, at 104, the AP 20 may select one or more wireless channels to allocate to the second network 14 for wireless communication within the second wireless network 14. In various embodiments, the selector 20a in the AP 20 may select the one or more wireless channels. The selecting of the one or more wireless channels may be configured to reduce a likelihood that communications among the devices of the second network 14 interfere with communications among devices of the first network 12. In various embodiments, the AP 20 may determine a likelihood of interference among each of a plurality of potential wireless channels and one or more wireless channels utilized by one or more devices (e.g., devices 20, 22, 24 and 30) associated with the first network 12, and subsequently, the AP 20 may select the one or more wireless channels from the plurality of potential wireless channels to allocate to the second network 14 such that the likelihood of interference among the selected one or more wireless channels and another one or more wireless channels utilized by devices associated with the first network is reduced.

It should be apparent to those skilled in the art that although the AP 20 is illustrated in FIG. 2a to be selecting the one or more wireless channels, in various embodiments, this may not necessarily be the case. For example, in various embodiments, an administrator of the first network 12 may perform the selection operation. Alternatively, in other embodiments, a dedicated selector, external to the AP 20, may perform the selection operation. In yet other embodiments, the selection may be performed by any other suitable device associated with the first network 12.

In various embodiments, the selection of the one or more wireless channels may be dynamic in nature. For example, with a change in the channels utilized by one or more devices associated with the first network 12, the one or more wireless channels selected at 104 may also change.

In various embodiments, the AP 20 may advertise the one or more wireless channels, which were selected at 104, to other wireless devices associated with the first network 12. For example, referring again to FIGS. 1 and 2a, at 108, the AP 20 may transmit a frequency allocation information element (FAIE) that includes an identification of the selected one or more wireless channels. In various embodiments, the transmitter 20b within the AP 20 may transmit the FAIE. In various other embodiments, a transmitter (not illustrated in FIG. 1) external to the AP 20 may also be used to transmit the FAIE. In various embodiments, the AP 20 may transmit a beacon frame that includes the FAIE. In various embodiments, the AP 20 may transmit the beacon frame at a periodic interval, without any solicitation from any other device, and may advertise the selected one or more wireless channels through the FAIE included in the beacon. In various embodiments, the AP 20 may also transmit a probe response frame, in response to a probe from another wireless device, and the probe response frame may include the FAIE. The FAIE may also be included in a re-association response frame and/or an action frame, which are well known to those skilled in the art.

Figure 2B:
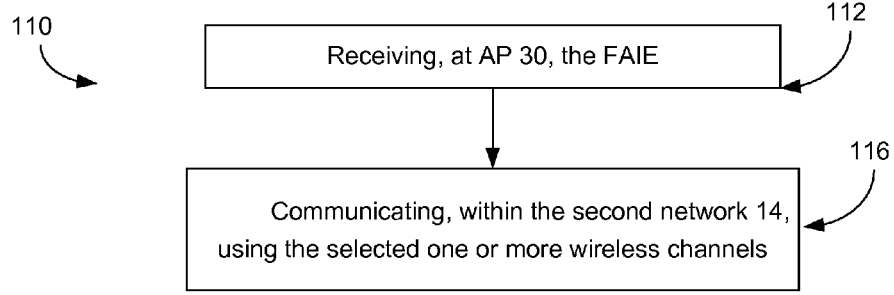

FIG. 2b illustrates a flowchart of a method 110 for dynamic channel allocation, in accordance with various embodiments of the present disclosure. Referring to FIGS. 1 and 2b, at 112, the device 30 may receive an FAIE (that was transmitted, for example, at 108 of FIG. 2a) included in the beacon frame, the probe response frame, the re-association response frame and/or the action frame. As previously discussed, device 30 may also act as an AP for the second network 14, and accordingly, the device 30 may transmit the identification of the selected one or more channels to devices 32 and 34, and communicate with the devices 32 and 34 using the selected one or more wireless channels. That is, communication within the second network 14 may be performed using the selected one or more channels at 116.

As previously discussed, the channel selection at 104 may be performed such that the selected channels create minimum interference with the communication within the first network 12. With the devices of the second network 14 communicating, at 116, using the selected one or more channels, inter-network interference, e.g., interference between communications within the first and the second networks, may be relatively low.

Figure 3:
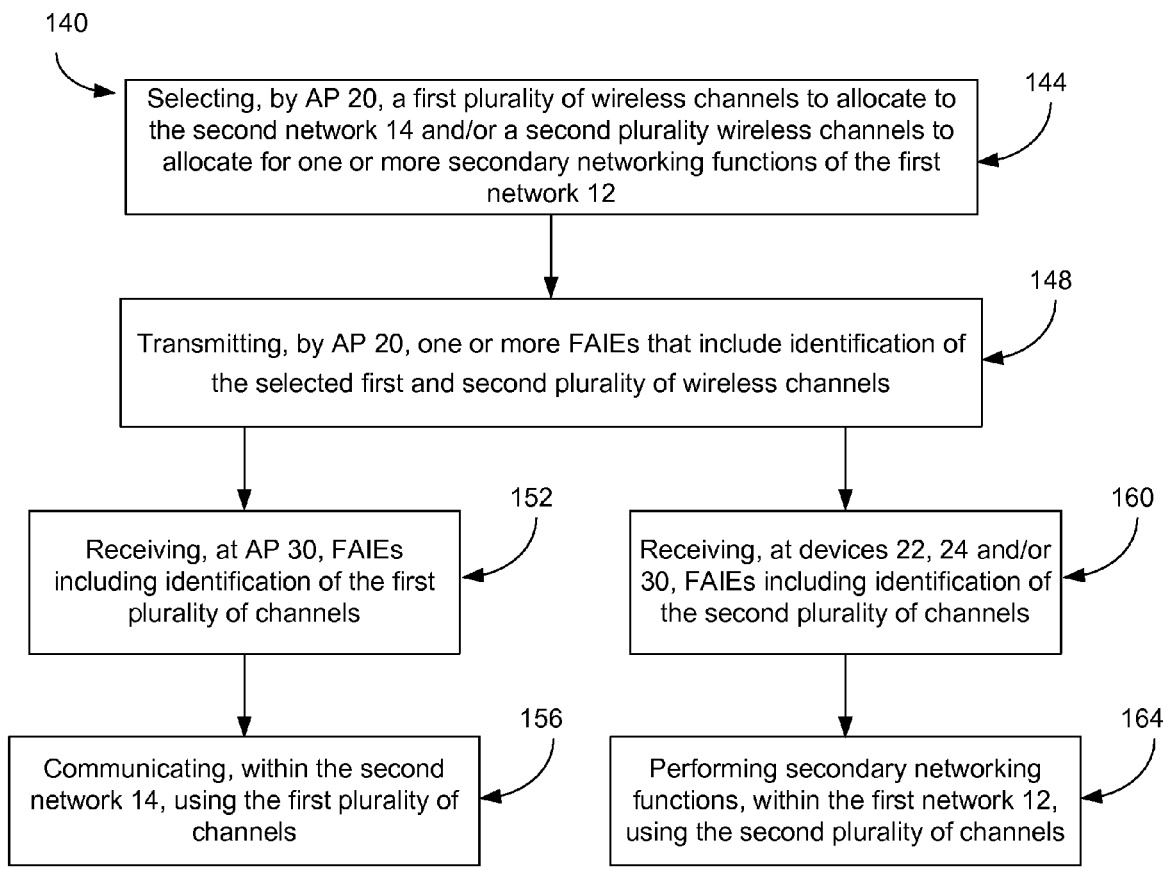
FIG. 3 illustrates another flow chart of a method for dynamic channel allocation, in accordance with various embodiments of the present disclosure.

FIG. 3 illustrates a flowchart for a method 140 for dynamic channel allocation, in accordance with various embodiments of the present disclosure. Referring to FIGS. 1 and 3, at 144, the AP 20 may select a first plurality of channels to allocate for communication within the second network 14 and/or a second plurality of channels to allocate for one or more secondary networking functions of the first network 12. As would be apparent to those skilled in the art, in various embodiments, instead of selecting a first plurality of channels, the AP 20 may select only one channel to allocate for communication within the second network 14. Similarly, instead of selecting a second plurality of channels, in various embodiments, the AP 20 may select only one other channel to allocate for one or more secondary networking functions of the first network 12.

In various embodiments, the one or more secondary networking functions may refer to various secondary operations within the first network 12, like paging a device (e.g., device 22, 24 and/or 30) associated with the first network, roaming of a device within the first network (or to an adjacent network, not illustrated in FIG. 1), parking of a device, etc. For example, one or more of the second plurality of channels may be allocated for devices 22, 24 and/or 30 to receive paging indications from the AP 20 (or any other APs associated to the first network 12 or any other adjacent network). Similarly, one or more of the second plurality of channels may be used by device 22, 24 and/or 30 as a roaming channel while roaming within the first network 12 or to an adjacent network, and one or more of the second plurality of channels may also be used by device 22, 24 and/or 30 as a parking channel when the device is inactive.

In various embodiments, the AP 20 may advertise the selected first and the second plurality of channels to one or more wireless devices associated with the first network 12. Thus, at 148, the AP 20 may transmit one or more FAIEs that include identification of the selected first and second plurality of channels. For example, a first FAIE may include identification of the selected first plurality of channels, a second FAIE may include identification of a one or more of the selected second plurality of channels that is intended for a first secondary networking function, a third FAIE may include identification of one or more of the selected second plurality of channels that is intended for a second secondary networking function, and so on. However, any other possible configuration of the FAIEs may also be possible. As previously discussed, the FAIEs may be included in a beacon frame, a probe response frame, a re-association response frame and/or an action frame transmitted by the AP 20.

At 152, the device 30 may receive one or more FAIEs that include identification of the first plurality of channels, and at 156, all devices associated with the second network 14 may communicate using one or more of the selected first plurality of channels.

Devices 22, 24 and/or 30 may also receive, at 160, the one or more FAIEs that include identification of the second plurality of channels. At 164, the devices 22, 24 and/or 30 may use one or more of the second plurality of channels to participate in one or more secondary networking functions. For example, device 24 may use one of the second plurality of channels as a parking channel when the device 24 is in an inactive or sleep state.

Advertising the second plurality of channels, by the AP 20, for one or more secondary networking functions may have several advantages. For example, devices 22, 24 and/or 30 may directly use the one or more second plurality of channels whenever intended, without needing to scan a large number of channels to find a channel suitable for an intended secondary networking function, thereby saving the device's power and time.

Figures 4, 5:
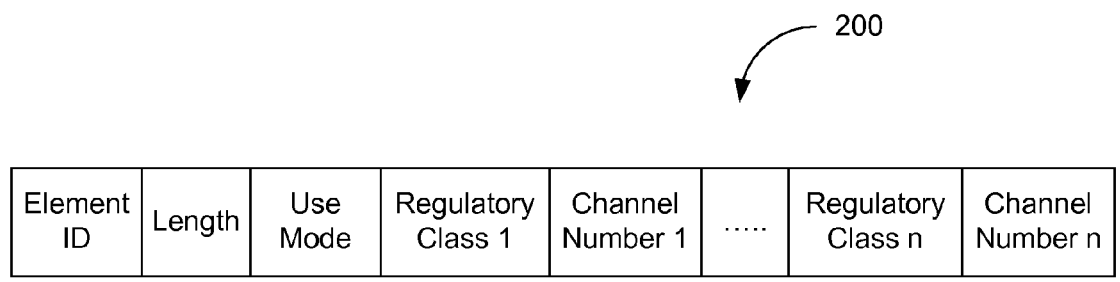
FIG. 4 illustrates a frequency allocation information element (FAIE), in accordance with various embodiments of the present disclosure.
FIG. 5 illustrates values of a use mode field included in the FAIE of FIG. 4, in accordance with various embodiments of the present disclosure.

FIG. 4 illustrates an exemplary FAIE 200, in accordance with various embodiments of the present disclosure. In various embodiments, the FAIE 200 may include an element identification field, which may include an identification number and/or include information which may be used to identify the FAIE.

The FAIE 200 may also include a length field, a use mode field, and one or more channel numbers along with identification of corresponding one or more regulatory classes. A regulatory class may be an enumerated value specifying a frequency band in which a corresponding channel is valid. The length field may include information on the length of the FAIE 200. The length of the FAIE 200 may be based at least in part on the lengths of other fields included in the FAIE, including, for example, the number of channel numbers and regulatory classes included in the FAIE 200.

In various embodiments, the use mode field may indicate a purpose for which the selected channels are intended to be used. FIG. 5 illustrates exemplary values of the use mode field included in the FAIE 200 of FIG. 4, in accordance with various embodiments of the present disclosure. Referring to FIGS. 4 and 5, if the use mode field is '0,' it may indicate, for example, that the selected channels and regulatory classes included in the FAIE 200 are allocated to the second network 14 for wireless communication within the second network 14. A value of '1' of the use mode field may indicate that the selected channels and regulatory classes included in the FAIE 200 are allocated to a peer-to-peer network (not illustrated in the figures) for wireless communication within the peer-to-peer network. Other values of the FAIE may be used for different secondary networking functions. For example, a value of '2' may indicate that the selected channels are assigned as paging channels, a value of '3' may indicate that the channels are assigned for roaming, and/or a value of '4' may indicate that the channels are assigned for parking. Some of the use mode values (e.g., 5-7) may be used for some other purposes or may be reserved for possible future use. It will be readily apparent to those skilled in the art that any other configuration of the use mode field values is also possible.

The FAIE 200 may also include n numbers of selected channels and associated regulatory classes. As discussed with respect to FIGS. 2 and 3, one or more of these channels may be used for communication within the second network 14 or may be used for one or more secondary networking functions within the first network 12, based at least in part on the value of the use mode field.

Figure 6:
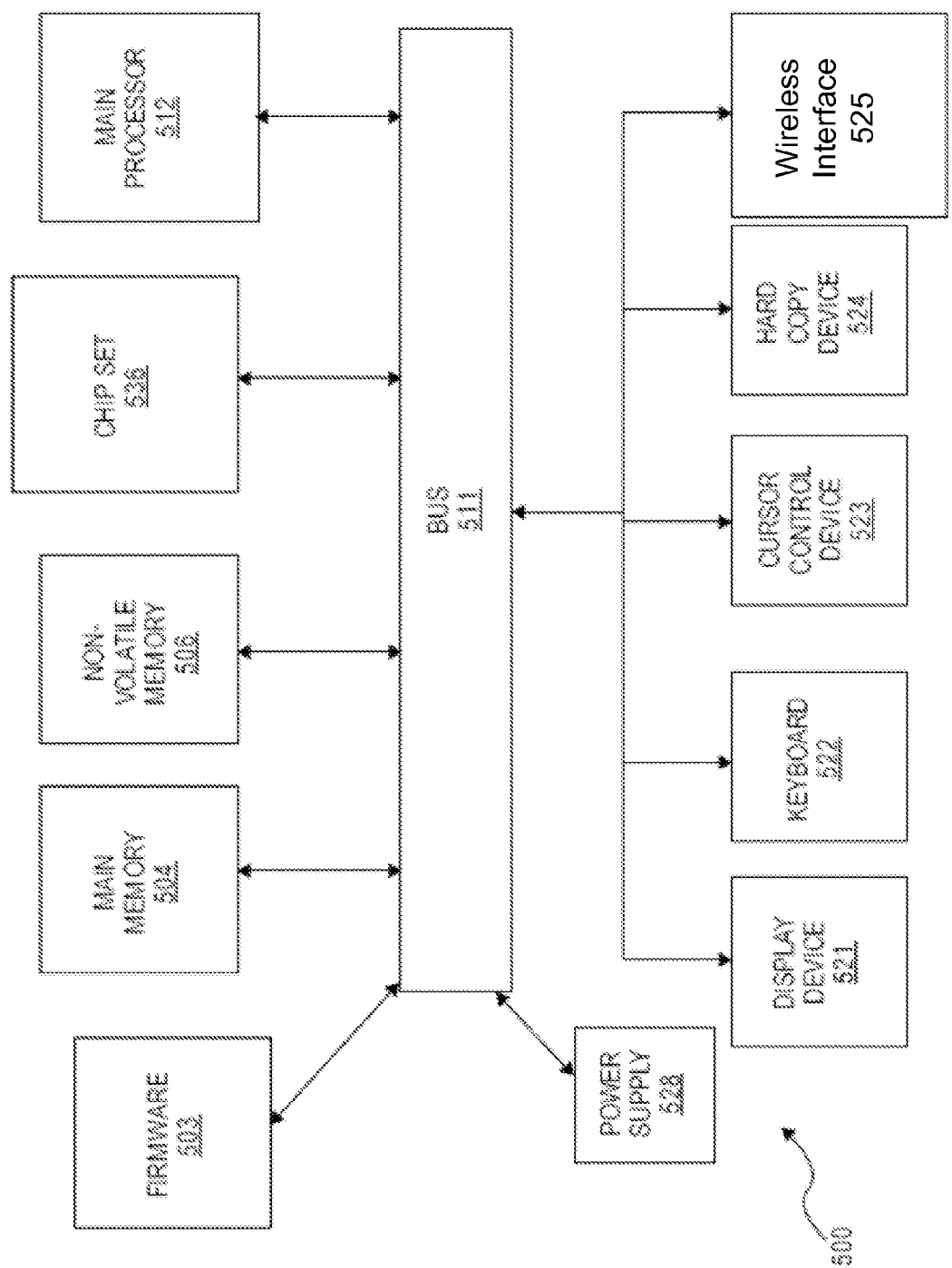
FIG. 6 illustrates a block diagram of an example computing system that may be suitable for practicing some of the embodiments of the present disclosure, including dynamic allocation of the channel.

FIG. 6 illustrates a block diagram of an example computing system 500 that may be suitable for practicing some of the embodiments of the present disclosure, including dynamic allocation of the channel. In some embodiments, the computing system 500 may include a communication mechanism or bus 511 for communicating information, and an integrated circuit component such as a processor 512 coupled with bus 511 for processing information.

Computing system 500 further comprises a random access memory (RAM) or other dynamic storage device 504 (referred to as main memory) coupled to bus 511 for storing information and instructions to be executed by processor 512. Main memory 504 also may be used for storing temporary variables or other intermediate information during execution of instructions by processor 512.

Firmware 503 may be a combination of software and hardware, such as Electronically Programmable Read-Only Memory (EPROM) that has the operations for the routine recorded on the EPROM. The firmware 503 may embed foundation code, basic input/output system code (BIOS), or other similar code. The firmware 503 may make it possible for the computing system 500 to boot itself.

Computing system 500 also comprises a read-only memory (ROM) and/or other static storage device 506 coupled to bus 511 for storing static information and instructions for processor 512. The static storage device 506 may store OS level and application level software.

Computing system 500 may further be coupled to a display device 521, such as a cathode ray tube (CRT) or liquid crystal display (LCD), coupled to bus 511 for displaying information to a computer user. A chipset, such as chipset 536, may interface with the display device 521.

An alphanumeric input device (keyboard) 522, including alphanumeric and other keys, may also be coupled to bus 511 for communicating information and command selections to processor 512. An additional user input device is cursor control device 523, such as a mouse, trackball, trackpad, stylus, or cursor direction keys, coupled to bus 511 for communicating direction information and command selections to processor 512, and for controlling cursor movement on a display device 521. A chipset, such as chip set 536, may interface with the input output devices.

Another device that may be coupled to bus 511 is a hard copy device 524, which may be used for printing instructions, data, or other information on a medium such as paper, film, or similar types of media. Furthermore, a sound recording and playback device, such as a speaker and/or microphone (not shown) may optionally be coupled to bus 511 for audio interfacing with computing system 500. Another device that may be coupled to bus 511 is a wireless communication capability 525.

Computing system 500 has a power supply 528 such as a battery, AC power plug connection and rectifier, etc., as one of ordinary skill in the relevant art will appreciate based at least on the teachings provided herein.

In various embodiments, the computing system 500 may be used as the AP 20 of FIG. 1, and may include a selector (similar to the selector 20a) to select one or more wireless channels to allocate to the second network 14 and/or for one or more secondary networking functions. In various embodiments, the processor 512 may execute instructions that may result in the selection of the one or more wireless channels. The computing system 500 may also include a transmitter (similar to the transmitter 20b) to transmit the identification of the selected channels included in one or more FAIEs. In various embodiments, the wireless interface 525 may act as the transmitter. Alternatively, a separate transmitter, coupled to the computing system 500 may act as the transmitter. The computing system 500 may also include transmitters and receivers to wirelessly communicate with one or more of the devices 22, 24 and/or 30, and may be configured to act as an AP of the first network 12.

In various embodiments, the computing system 500 may also be used as the AP 30 of FIG. 1, and may include a receiver (similar to the receiver 30a) to receive the one or more FAIEs that include identification of one or more wireless channels to be allocated to the second network 14. The computing system 500 may include transmitters and receivers to wirelessly communicate with the AP 20 of the first network 12 and/or devices 32 and/or 34 of the second network 14, and may be configured to act as an AP of the second network 14.

In various embodiments, the computing system 500 may also be used as devices 22, 24, 32 or 34. In that case, the computing system 500 may include transmitters and receivers to wirelessly communicate with the access point of the network to which the device is associated.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    selecting, by an access point (AP) of an infrastructure based wireless network, a first wireless channel for communications among a first plurality of wireless devices of a non-infrastructure based wireless network, the selecting of the first wireless channel being configured to reduce a likelihood that communications among the first plurality of wireless devices, in accordance with a first wireless communication protocol, interfere with communications among a second plurality of wireless devices of the infrastructure based wireless network in accordance with a second wireless communication protocol that is different from the first wireless communication protocol, the second plurality of wireless devices including the AP;
    selecting, by the AP, a second wireless channel for secondary networking functions within the infrastructure based wireless network;
    transmitting, in accordance with the second wireless communication protocol, by the AP to a wireless device of the first plurality of wireless devices, a first information element to communicate an allocation of the first wireless channel to the first plurality of wireless devices; and
    transmitting, in accordance with the second wireless communication protocol, by the AP to the wireless device of the first plurality of wireless devices, a second information element to communicate an allocation of the second wireless channel to the first plurality of wireless devices for one or more secondary networking functions within the infrastructure based wireless network, wherein the one or more secondary networking functions include a paging function, a parking function, or a roaming function.

2. The method of claim 1, wherein the communications within the infrastructure based wireless network and the non-infrastructure based wireless network are in accordance with a common wireless communication standard.

3. The method of claim 1, wherein said selecting the first wireless channel comprises:
    determining a likelihood of interference among each of a plurality of potential wireless channels and one or more wireless channels utilized by the second plurality of wireless devices; and
    selecting the first wireless channel from the plurality of potential wireless channels based at least in part on said determining of the likelihood of interference.

4. The method of claim 1, wherein said transmitting the first or second information element further comprises:
    transmitting a beacon frame that includes the first or second information element.

5. The method of claim 1, wherein said transmitting the first or second information element further comprises:
    transmitting a probe response frame that includes the first or second information element.

6. The method of claim 1, wherein the first information element further includes an identification of a regulatory class associated with the selected first wireless channel.

7. The method of claim 1, wherein the first information element is further configured to communicate an allocation of a third wireless channel to the first plurality of wireless devices.

8. The method of claim 1, wherein the infrastructure based wireless network is a local area network.

9. The method of claim 8, wherein the non-infrastructure based wireless network is a personal area network.

10. A method comprising:
receiving in accordance with a second wireless communication protocol, at a wireless device of a first plurality of wireless devices of a non-infrastructure based wireless network, a first information element from an access point (AP) of an infrastructure based wireless network, the first information element communicating an allocation by the AP of one or more first wireless channels for communications among the first plurality of wireless devices that reduces a likelihood that communications among the first plurality of wireless devices, in accordance with a first wireless communication protocol, interfere with communications among a second plurality of devices of the infrastructure based wireless network in accordance with the second wireless communication protocol, the first wireless communication protocol being different from the second wireless communication protocol;
selecting, by the wireless device, a first wireless channel from the one or more first wireless channels;
communicating, by the wireless device, with at least one wireless device of the first plurality of wireless devices on the first wireless channel; and
receiving in accordance with the second wireless communication protocol, at the wireless device of the first plurality of wireless devices of the non-infrastructure based wireless network, a second information element from the AP of the infrastructure based wireless network, the second information element communicating an allocation by the AP of one or more second wireless channels for one or more secondary networking functions within the infrastructure based wireless network, wherein the one or more secondary networking functions include a paging function, a parking function, or a roaming function.

11. The method of claim 10, further comprising:
communicating, by the wireless device, with the AP on another wireless channel, which is different from the one or more first wireless channels.

12. The method of claim 10, wherein communications within the infrastructure based wireless network and the non-infrastructure based wireless network are in accordance with a common wireless communication standard.

13. The method of claim 10, wherein the non-infrastructure based network is a peer-to-peer network.

14. The method of claim 10, wherein the non-infrastructure based network is a personal area network.

15. An apparatus comprising:
a wireless interface; and
a selector coupled to the wireless interface and configured to
allocate one or more first wireless channels for communications among a first plurality of wireless devices of a non-infrastructure based wireless network to reduce a likelihood that communications among the first plurality of wireless devices, in accordance with a first wireless communication protocol, interfere with communications among a second plurality of wireless devices of an infrastructure based wireless network in accordance with a second wireless communication protocol that is different from the first wireless communication protocol, the second plurality of wireless devices including the apparatus,
allocate a second wireless channel for one or more secondary networking functions within the infrastructure based wireless network,
transmit, in accordance with the second wireless communication protocol via the wireless interface, a first information element to communicate the allocation of the one or more first wireless channels to a wireless device of the first plurality of wireless devices, and
transmit, in accordance with the second wireless communication protocol via the wireless interface, a second information element to communicate the allocation of the second wireless channel to the first plurality of wireless devices for the one or more secondary networking functions within the infrastructure based wireless network, wherein the one or more secondary networking functions include a paging function, a parking function, or a roaming function.

16. The apparatus of claim 15, the first information element includes identification information about the one or more wireless channels.

17. The apparatus of claim 15, wherein communications within the infrastructure based wireless network and the non-infrastructure based wireless network are in accordance with a common wireless communication standard.

18. The apparatus of claim 17, wherein the infrastructure based wireless network is a local area network and the non-infrastructure based wireless network is a personal area network.

19. The apparatus of claim 15, wherein the selector is further configured to allocate a wireless channel to the plurality of wireless devices for a paging function, a roaming function, or a parking function.

20. The method of claim 1, wherein:
the first information element includes a first use mode field having a value to indicate that the first wireless channel is allocated for wireless communication within the non-infrastructure based wireless network; and
the second information element includes a second use mode field having a value to indicate that that the second channel is allocated for the one or more secondary networking functions within the infrastructure based wireless network.

21. The method of claim 1, wherein the first information element or the second information element includes a use mode field that indicates a purpose for which a selected wireless channel is intended to be used, wherein the use mode field is configured to have
a first value that indicates that a selected wireless channel is allocated for wireless communication within a personal area network,
a second value that indicates that a selected wireless channel is allocated for wireless communication within a peer-to-peer network,
a third value that indicates that a selected wireless channel is allocated for a paging function,
a fourth value that indicates that a selected wireless channel is allocated for a roaming function, and
a fifth value that indicates that a selected wireless channel is allocated for a parking function.

* * * * *